US011371388B2

(12) United States Patent
Futae et al.

(10) Patent No.: US 11,371,388 B2
(45) Date of Patent: Jun. 28, 2022

(54) ROTARY MACHINE AND JOURNAL BEARING

(71) Applicant: MITSUBISHI HEAVY INDUSTRIES, LTD., Tokyo (JP)

(72) Inventors: Takaya Futae, Tokyo (JP); Tatsuya Ishizaki, Tokyo (JP); Hiromichi Oba, Tokyo (JP); Taiyo Shirakawa, Nagasaki (JP)

(73) Assignee: MITSUBISHI HEAVY INDUSTRIES MARINE MACHINERY & EQUIPMENT CO., LTD., Tokyo (JP)

( * ) Notice: Subject to any disclaimer, the term of this patent is extended or adjusted under 35 U.S.C. 154(b) by 0 days.

(21) Appl. No.: 16/755,724

(22) PCT Filed: Jul. 23, 2018

(86) PCT No.: PCT/JP2018/027480
§ 371 (c)(1),
(2) Date: Apr. 13, 2020

(87) PCT Pub. No.: WO2019/092928
PCT Pub. Date: May 16, 2019

(65) Prior Publication Data
US 2021/0199021 A1     Jul. 1, 2021

(30) Foreign Application Priority Data

Nov. 10, 2017  (JP) .............................. JP2017-217658

(51) Int. Cl.
*F01D 25/16*       (2006.01)
*F01D 25/18*       (2006.01)
*F02C 6/12*        (2006.01)

(52) U.S. Cl.
CPC ........... *F01D 25/162* (2013.01); *F01D 25/18* (2013.01); *F02C 6/12* (2013.01); *F05D 2220/40* (2013.01);
(Continued)

(58) Field of Classification Search
CPC .......... F01D 25/162; F01D 25/18; F02C 6/12; F05D 2220/40; F05D 2240/50;
(Continued)

(56) References Cited

U.S. PATENT DOCUMENTS 6,017,184  A  *  1/2000  Aguilar .................... F04D 29/26
                                                       415/112
2007/0110351 A1 *  5/2007  Larue ..................... F01D 25/164
                                                       384/535
(Continued)

FOREIGN PATENT DOCUMENTS

CN        104420899 A      3/2015
FR        2980536 B1      12/2015
(Continued)

OTHER PUBLICATIONS

International Search Report dated Oct. 9, 2018, issued in counterpart application No. PCT/JP2018/027480, with English Translation. (4 pages).
(Continued)

*Primary Examiner* — Devon C Kramer
*Assistant Examiner* — Kelsey L Stanek
(74) *Attorney, Agent, or Firm* — WHDA, LLP

(57) ABSTRACT

A turbocharger (1A) includes a rotary shaft (2), a journal bearing (5A), and a bearing housing (10). The journal bearing (5A) includes load support surfaces (14 and 15), a first gap forming portion (F1), and a second gap forming portion (F2). The first gap forming portion (F1) firms a first gap (101) in a radial direction between the load support
(Continued)

surfaces (14 and 15) adjacent to each other in a direction of a central axis (O). The second gap forming portion (F2) forms a second gap (102) smaller than the first gap in the radial direction between the load support surfaces (14 and 15) adjacent to each other in the direction of the central axis (O).

1 Claim, 11 Drawing Sheets

(52) U.S. Cl.
CPC ...... *F05D 2240/50* (2013.01); *F05D 2260/98* (2013.01)

(58) Field of Classification Search
CPC .. F05D 2260/98; F16C 27/02; F16C 2360/24; F16C 33/6659
USPC ............................. 415/229; 60/598; 384/537
See application file for complete search history.

(56) References Cited

U.S. PATENT DOCUMENTS

| | | | | |
|---|---|---|---|---|
| 2009/0110572 | A1* | 4/2009 | Meacham | F02C 6/12 |
| | | | | 417/406 |
| 2011/0176907 | A1* | 7/2011 | Groves | F16C 33/1065 |
| | | | | 415/1 |
| 2013/0202432 | A1* | 8/2013 | House | F16C 33/46 |
| | | | | 415/229 |
| 2014/0069094 | A1* | 3/2014 | Marsal | F16C 35/067 |
| | | | | 60/598 |
| 2015/0240871 | A1 | 8/2015 | Oki et al. | |
| 2017/0328273 | A1* | 11/2017 | Hettinger | F16C 35/042 |
| 2018/0128318 | A1 | 5/2018 | Ueda | |

FOREIGN PATENT DOCUMENTS

| | | |
|---|---|---|
| JP | S61-086535 U | 6/1986 |
| JP | 2008-286050 A | 11/2008 |
| JP | 2010-223249 A | 10/2010 |
| JP | 2015-048755 A | 3/2015 |
| JP | 2015-209837 A | 11/2015 |
| WO | 2009/013453 A1 | 1/2009 |
| WO | 2017/014084 A1 | 1/2017 |

OTHER PUBLICATIONS

Written Opinion dated Oct. 9, 2018, issued in counterpart application No. PCT/JP2018/027480, with English Translation. (25 pages).

* cited by examiner

ROTARY MACHINE AND JOURNAL BEARING

TECHNICAL FIELD

The present invention relates to a rotary machine and a journal bearing.

Priority is claimed on Japanese Patent. Application No. 2017-217658, filed on Nov. 10, 2017, the content of which is incorporated herein by reference.

BACKGROUND ART

A rotary machine such as a turbocharger includes a rotary shaft and a bearing that supports the rotary shaft to be rotatable around a central axis.

For example, PTL 1 discloses a configuration in which the rotary shaft is supported by two bearings arranged at an interval in a central axis direction.

CITATION LIST

Patent Literature

[PTL 1] PCT International Publication No. WO2009/013453

Technical Problem

Incidentally, in a case where the bearing is a journal bearing, an oil film is formed by a lubricant between an inner peripheral surface of the bearing and an outer peripheral surface of the rotary shaft, and between an outer peripheral surface of the bearing and an inner peripheral surface of a bearing housing for supporting the bearing.

When the bearings are arranged at an interval in the direction of the central axis as in PTL 1, if a difference in vibration damping characteristics is generated due to the oil film between the plurality of bearings that support the rotary shaft, in some cases, vibrations may be generated when the rotary shaft is rotated. The vibrations are classified into a parallel mode and a conical mode. If the number of revolutions of the rotary shaft increases, the generated vibrations increase.

The present invention is made in view of the above-described circumstances, and an object thereof is to provide a rotary machine and a journal bearing which can suppress vibrations of a rotary shaft.

Solution to Problem

In order to solve the above-described problem, the present invention adopts the following means.

According to a first aspect of the present invention, there is provided a rotary machine including a rotary shaft: that extends along a central axis, a journal bearing that supports the rotary shaft to be rotatable around the central axis, and a bearing housing that supports the journal bearing. Furthermore, in the rotary machine, the journal bearing includes load support surfaces that are formed in a plurality of locations at an interval in a direction of the central axis, that face at least one of the rotary shaft and the bearing housing, and that support a load applied in a direction perpendicular to the central axis, a first gap forming portion that is formed between the load support surfaces adjacent to each other in the direction of the central axis, and that forms a first gap with at least one of the rotary shaft and the bearing housing in a radial direction around the central axis, and a second gap forming portion that is formed in a portion of the first gap forming portion in the direction of the central axis, and that forms a second gap smaller than the first gap with at least one of the rotary shaft and the bearing housing in the radial direction.

According to this configuration, the journal bearing has the load support surfaces that are arranged at an interval in the direction of the central axis. Therefore, the plurality of load support surfaces are integrated with each other. In this manner, it is possible to suppress vibrations in a conical mode of the rotary shaft.

In addition, the first gap and the second gap are formed between the load support surfaces adjacent to each other in the direction of the central axis. The second gap is smaller than the first gap. In this manner, an oil film of a lubricant is held between the second gap and at least one of the rotary shaft and the bearing housing. Accordingly, it is possible to achieve a vibration damping effect of the rotary shaft. The second gap for achieving the vibration damping effect is provided between the plurality of load support surfaces. In this manner, it is possible to suppress the vibrations in a parallel mode of the rotary shaft.

According to a second aspect of the present invention, in the rotary machine according to the first aspect, the journal bearing may integrally include a plurality of bearing portions that are arranged at an interval in the direction of the central axis, and that each have at least one of the load support surfaces an intermediate facing portion that is arranged between the plurality of bearing portions in the direction of the central axis, and that forms the second gap with at least one of the rotary shaft and the bearing housing, and a connecting portion that extends in the direction of the central axis to connect the plurality of bearing portions and the intermediate facing portion to each other, and that forms the first gap with at least one of the rotary shaft and the bearing housing.

In this way, the plurality of bearing portions, the intermediate facing portion, and the connecting portion are provided integrally with each other. Accordingly, the journal bearing that integrally has the intermediate facing portion for forming the second gap can be configured between the plurality of bearing portions. In this manner, it is possible to suppress the vibrations in the conical mode and the parallel mode of the rotary shaft.

According to a third aspect of the present invention, the rotary machine according to the first or second aspect may further include a lubricant supply unit that is configured to supply a lubricant to between the journal bearing and at least one of the rotary shaft and the bearing housing. The lubricant supply unit may supply the lubricant to the second gap.

According to this configuration, the vibration damping effect of the rotary shaft can be achieved between the plurality of load support surfaces by the oil film formed in the second gap.

According to a fourth aspect of the present invention, the rotary machine according to any one of first to third aspects may further include a lubricant supply unit that is configured to supply a lubricant to between the journal bearing and at least one of the rotary shaft and the bearing housing. The lubricant supply unit may supply the lubricant to between the load support surface and at least one of the rotary shaft and the bearing housing. According to this configuration, the lubricant can be fed to between the load support surface and at least one of the rotary shaft and the bearing housing. The vibration damping effect of the rotary shaft can be achieved in the plurality of locations arranged at an interval in the direction of the central axis.

According to a fifth aspect of the present invention, in the rotary machine according to any one of the first to fourth aspects, the journal bearing may have a first facing surface that is formed between the load support surfaces adjacent to each other in the direction of the central axis, and that faces at least one of the rotary shaft and the bearing housing via the first gap in the radial direction, and a second facing surface that is formed in a portion of the first facing surface in the direction of the central axis, and that faces at least one of the rotary shaft and the bearing housing via the second gap in the radial direction.

According to this configuration, the first gap is formed between the first facing surface of the journal bearing and at least one of the rotary shaft and the bearing housing. In addition, the second gap is formed between the second facing surface of the journal bearing and at least one of the rotary shaft and the bearing housing.

In this manner, the rotary machine having the second gap can be configured between the two first gaps in the direction of the central axis.

According to a sixth aspect of the present invention, in the rotary machine according to the fifth aspect, the first facing surface may be formed in a recess portion recessed in the radial direction from the load support surfaces adjacent to each other in the direction of the central axis. The second facing surface may be formed in a portion of the recess portion, and may be formed in a projection portion projecting in the radial direction from the first facing surface.

According to this configuration, the first facing surface for forming the first gap can be formed in the recess portion formed in the journal hearing, and the second facing surface for forming the second gap can be formed in the projection portion.

According to a seventh aspect of the present invention, in the rotary machine according to the first to sixth aspects, the rotary shaft may include a shaft side projection that projects outward in the radial direction so as to form the second gap with the journal bearing.

According to this configuration, the second gap for holding the oil film that achieves the vibration damping effect of the rotary shaft can be disposed between the shaft side projection formed in the rotary shaft and the journal bearing.

According to an eighth aspect of the present invention, in the rotary machine according to the first to seventh aspects, the bearing housing may include a housing side projection that projects inward in the radial direction so as to form the second gap with the journal bearing.

According to this configuration, the second gap for holding the oil film that achieves the vibration damping effect of the rotary shaft can be disposed between the housing side projection formed in the bearing housing and the journal bearing.

According to a ninth aspect of the present invention, in the rotary machine according to the first to eighth aspects, the second gap may be formed in an intermediate portion of the load support surfaces adjacent to each other in the direction of the central axis.

According to this configuration, the vibration damping effect of the rotary shaft can be effectively achieved by the oil film held in the second gap in the intermediate portion of the load support surfaces adjacent to each other.

According to a tenth aspect of the present invention, there is provided a journal bearing for supporting a rotary shaft to be rotatable around a central axis. At least one of an outer peripheral surface facing outward in a radial direction around the central axis and an inner peripheral surface facing inward in the radial direction includes load support surfaces that are formed in a plurality of locations at an interval in a direction of the central axis, and that support a load applied in a direction perpendicular to the central axis, a recess portion that is formed between the load support surfaces adjacent to each other in the direction of the central axis, and that is formed to be recessed in the radial direction from the load support surfaces, and a projection portion that is formed in a portion of the recess portion in the direct on of the central axis, and that projects in the radial direction from the recess portion.

According to this configuration, the journal bearing has the load support surfaces that are arranged at an interval in the direction of the central axis. Therefore, the plurality of load support surfaces are integrated with each other. In this manner, it is possible to suppress vibrations in a conical mode of the rotary shaft.

In addition, the projection portion is formed between the load support surfaces adjacent to each other in the direction of the central axis. In this manner, the oil film of the lubricant is held between the projection portion and at least one of the rotary shaft and the bearing housing. Accordingly, the vibration damping effect of the rotary shaft can be achieved. In this way, the projection portion that can form the oil film for achieving. In this way, the vibration damping effect is provided between the plurality of load support surfaces. In this manner, it is possible to suppress the vibrations in the parallel mode of the rotary shaft.

Advantageous Effects of Invention

According to the rotary machine and the journal bearing, it is possible to suppress the vibrations of the rotary shaft.

BEST MODE FOR CARRYING OUT THE INVENTION

Hereinafter, a rotary machine and a journal bearing according to an embodiment of the present invention will be described with reference to the drawings.

First Embodiment

Figure 1:
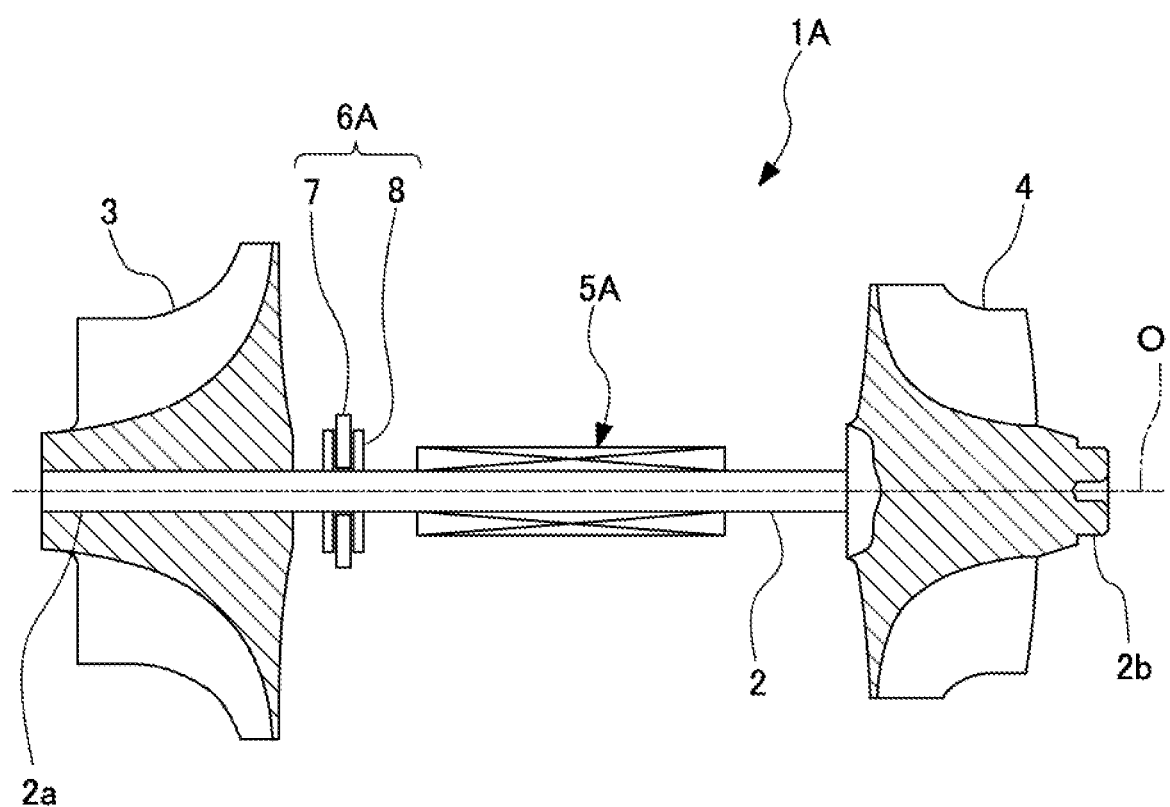
FIG. 1 is a schematic view illustrating, a configuration of a turbocharger according to an embodiment of the present invention.

FIG. 1 is a schematic view illustrating a configuration of a turbocharger according to an embodiment of the present invention.

As illustrated in FIG. 1, a turbocharger 1A according to this embodiment includes a rotary shaft 2, a turbine wheel 3, a compressor wheel 4, a journal bearing 5A, and a thrust bearing 6A. The turbocharger 1A described as an example in this embodiment is mounted on a ship by adopting a posture where a central axis O of the rotary shaft 2 extends in a horizontal direction.

The rotary shaft 2 is supported to be rotatable around the central axis O in a housing (not illustrated) of the turbocharger 1A.

The turbine wheel 3 is disposed on a first end portion 2a side of the rotary shaft 2. The turbine wheel 3 is rotated around the central axis O integrally with the rotary shaft 2 by using an exhaust gas flow exhausted from a main engine of the ship.

The compressor wheel 4 is disposed on a second end portion 2b side of the rotary shaft 2. The compressor wheel 4 is rotated around the central axis O integrally with the rotary shaft 2. The compressor wheel 4 compresses air introduced from the outside, and supplies the compressed air to the main engine.

The journal bearing 5A is supported by a bearing housing 10 (refer to FIG. 2) disposed inside a housing (not illustrated) of the turbocharger 1A. The journal bearing 5A supports the rotary shaft 2 to be rotatable around the central axis O. The journal bearing 5A mainly supports a load applied in the radial direction perpendicular to the central axis O of the rotary shaft 2.

The thrust bearing 6A is disposed inside a housing not illustrated) of the turbocharger 1A.

The thrust bearing 6A supports a load applied in a direction of the central axis O of the rotary shaft 2. The thrust bearing 6A includes a thrust disc 7 disposed in the rotary shaft 2 and a stationary disc 8 supported by a housing (not illustrated).

Figure 2:
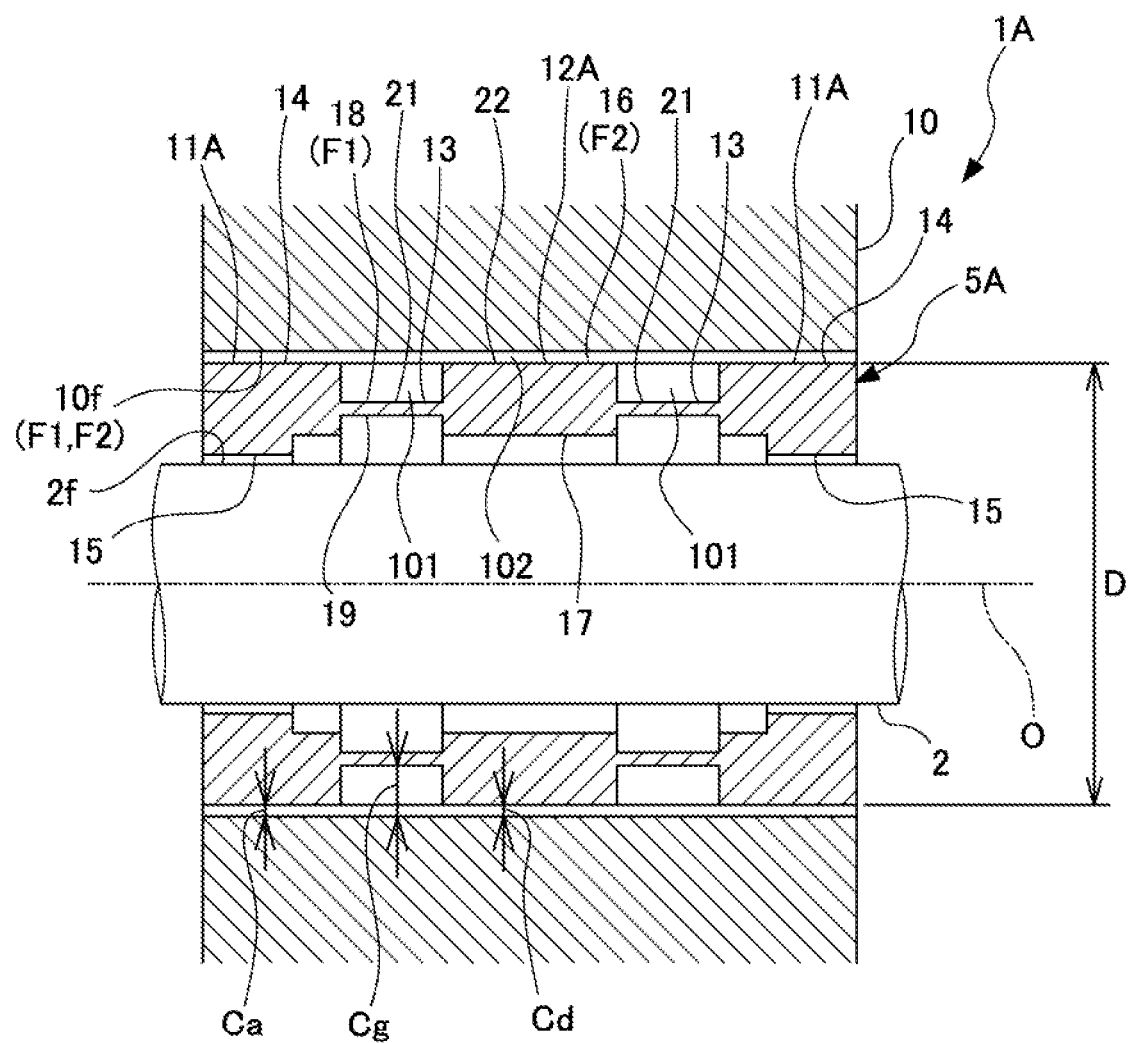
FIG. 2 is a sectional view illustrating a journal bearing according to a first embodiment of the present invention.

FIG. 2 is a sectional view illustrating the journal bearing according to a first embodiment of the present invention. As illustrated in FIG. 2, the journal bearing 5A in this embodiment is formed in a cylindrical shape in which an inner peripheral surface and an outer peripheral surface each have a circular shape in a cross section perpendicular to the axis O and are continuous with each other in the direction of the central axis O. The journal bearing 5A includes bearing portions 11A, an intermediate facing portion 12A, and a connecting portion 13.

The bearing portions 11A are each disposed in both end portions of the journal bearing 5A in the direction of the central axis O. The respective bearing portions 11A include an outer peripheral load support surface (load support surface) 14 and an inner peripheral load support surface (load support surface) 15.

The outer peripheral load support surface 14 faces an inner peripheral surface 10f of the bearing housing 10 in the radial direction around the central axis O (hereinafter, simply referred to as the "radial direction"). A minute gap of several µm to several tens of µm is formed between the outer peripheral load support surface 14 and the inner peripheral surface 10f of the bearing housing 10. This outer peripheral load support surface 14 supports a load applied in the radial direction perpendicular to the central axis O between the journal bearing 5A and the bearing housing 10.

The inner peripheral load support surface 15 faces an outer peripheral surface 2f of the rotary shaft 2 in the radial direction. A minute gap of several µm to several tens of µm is formed between the inner peripheral load support surface 15 and the outer peripheral surface 2f of the rotary shaft 2. The inner peripheral load support surface 15 supports a load applied in the radial direction between the journal bearing 5A and the rotary shaft 2.

The intermediate facing portion 12A is located between the two bearing portions 11A in both end portions in the direction of the central axis O, and is separated from the bearing portion 11A in the direction of the central axis O. The outer peripheral facing surface (second facing surface) 16 of the intermediate facing portion 12A faces the inner peripheral surface 10f of the bearing housing 10 with a gap in the radial direction. The gap in the radial direction between the outer peripheral facing surface 16 of the intermediate facing portion 12A and the inner peripheral surface 10f of the bearing housing 10 (hereinafter, referred to as a second gap 102) is set to a dimension Cd so that the oil film is held by the lubricant. The outer peripheral facing surface 16 of the intermediate facing portion 12A and the inner peripheral surface 10f of the bearing housing 10 configure a second gap forming portion F2 according to the present invention.

The dimension Cd of the gap between the outer peripheral facing surface 16 of the intermediate facing, portion 12A and the inner peripheral surface 10f of the beating housing 10 can be equal to or larger than a dimension. Ca of the gap between the outer peripheral load support surface 14 and the inner peripheral surface 10f of the bearing housing 10.

Here, if a diameter of the journal bearing 5A is set to D, for example, Cd/D=1/1000 to 20/1000 can be satisfied.

The inner peripheral surface 17 of the intermediate facing portion 12A in this embodiment is formed at a sufficient interval in the radial direction from the outer peripheral surface 21 of the rotary shaft 2.

The connecting portion 13 has a cylindrical shape extending in the direction of the central axis O, and connects each of the bearing portions 11A on both sides in the direction of the central axis O and the intermediate facing portion 12A of the intermediate portion in the direction of the central axis O to each other.

The diameter of the outer peripheral surface (first facing surface) 18 of the connecting portion 13 is set to be sufficiently smaller than the inner diameter of the inner peripheral surface 10f of the bearing housing 10. In this manner, the outer peripheral surface 18 of the connecting portion 13 is formed with a sufficient gap (hereinafter, referred to as a first gap 101) in the radial direction from the inner peripheral surface 10f of the bearing housing 10. The outer peripheral surface 18 of the connecting portion 13 and the inner peripheral surface 10f of the beating housing 10 configure a first gap forming portion F1 according to the present invention.

The diameter of the inner peripheral surface (first facing, surface) 19 of the connecting portion 13 is set to be sufficiently larger than the outer diameter of the outer peripheral surface 2f of the rotary shaft 2. In this manner, an inner peripheral surface 19 of the connecting portion 13 is formed at a sufficient interval in the radial direction front the outer peripheral surface 2f of the rotary shaft 2.

Here, it is preferable that a dimension Cg of a gap between the outer peripheral surface 18 of the connecting portion 13 and the inner peripheral surface 10f of the bearing housing 10 is equal to or larger than Cg/D=100/1000.

The journal bearing 5A configured in this way has recess portions 21 each formed by the outer peripheral surface 18 of the connecting portion 13 between the outer peripheral load support surfaces 14 adjacent to each other at an interval in the direction of the central axis O. The recess portion 21 is formed to be recessed inward in the radial direction from the outer peripheral surface (for example, the outer peripheral load support surface 14 or the outer peripheral facing surface 16) of the journal bearing 5A.

The journal bearing 5A further has a projection portion 22 that forms the outer peripheral facing surface 16 of the intermediate facing portion 12A in the intermediate portion of the two recess portions 21 in the direction of the central axis O. The projection portion 22 projects outward in the radial direction from the outer peripheral surface 18 of the recess portion 21.

In the journal bearing 5A, the oil film is formed by the lubricant in a gap between the inner peripheral load support surface 15 of the bearing portions 11A located in both end portions in the direction of the central axis O and the outer peripheral surface 2f of the rotary shaft 2. As the rotary shaft 2 is rotated, the lubricant is drawn into the gap between the inner peripheral load support surface 15 and the outer peripheral surface 2f of the rotary shaft 2, thereby forming the oil film. In this manner, the oil film is reliably formed. Accordingly, frictional resistance is reduced between the inner peripheral load support surface 15 and the outer peripheral surface 2f of the rotary shaft 2, and the vibration damping effect in the radial direction of the rotary shaft 2 is achieved.

In addition, in the journal bearing 5A, the oil film is formed by the lubricant in a gap between the outer peripheral load support surface 14 of the beating portions 11A located in both end portions in the direction of the central axis O and the inner peripheral surface 10f of the bearing housing 10. According to the oil film, the vibration damping effect in the radial direction is achieved between the journal bearing 5A and the bearing housing 10.

Furthermore, in the journal bearing 5A, the oil film is formed by the lubricant in the second gap 102 between the outer peripheral facing surface 16 of the intermediate facing portion 12A located in the intermediate portion in the direction of the central axis O and the inner peripheral surface 10f of the bearing housing 10. According to the oil film, the vibration damping effect in the radial direction is achieved between the journal bearing 5A and the bearing housing 10.

Therefore, according to the turbocharger 1A and the journal bearing 5A of the above-described first embodiment, the bearing portions 11A (the outer peripheral load support surface 14 and the inner peripheral load support surface 15) are provided at an interval in the direction of the central axis O. In this way, the bearing portions 11A arranged in two locations at an interval in the direction of the central axis O are integrated with each other, thereby suppressing an individual movement of the bearing portions 11A arranged in the two locations. In this manner, the vibrations in the conical mode of the rotary shaft 2 can be suppressed.

In addition, the first gap 101 and the second gap 102 are formed between the bearing portions 11A adjacent to each other in the direction of the central axis O, and the second gap 102 is smaller than the first gap 101. In this manner, in the second gap 102, the oil film of the lubricant can be held between the bearing housing 10 and the outer peripheral facing surface 16 of the intermediate facing portion 12A of the journal bearing 5A. According to the oil film, itis possible to achieve the vibration damping effect of the rotary shaft 2. In this way, the second gap 102 for achieving the vibration damping effect is provided between the outer peripheral load support surface 14 and the inner peripheral load support surface 15 of the plurality of bearing portions 11A. Accordingly, the vibrations in the parallel mode of the rotary shaft 2 can be suppressed.

In addition, the journal bearing 5A integrally has the intermediate facing portion 12A forming the second gap 102 between the plurality of bearing portions 11A. The journal bearing 5A configured in this way can suppress the vibrations in the conical mode and the parallel mode of the rotary shaft 2.

Furthermore, the second gap 102 is located in the intermediate portion of the outer peripheral load support s surfaces 14 adjacent to each other in the direction of the central axis O. According to this configuration, the vibration damping effect of the rotary shaft 2 can be effectively achieved by the oil film held in the second gap 102 in the intermediate portion of the outer peripheral load support surfaces 14 adjacent to each other.

Second Embodiment

Next, a second embodiment of the turbocharger and the journal bearing according to the present invention will be described. In the second embodiment described below, only a configuration in which the inner peripheral surface of the journal bearing also includes the projection portion capable of forming the oil film for achieving the vibration damping effect is different from that according to the first embodiment. Therefore, the same reference numerals e given to the same elements as those according to the first embodiment, and repeated description thereof will be omitted.

Figure 3:
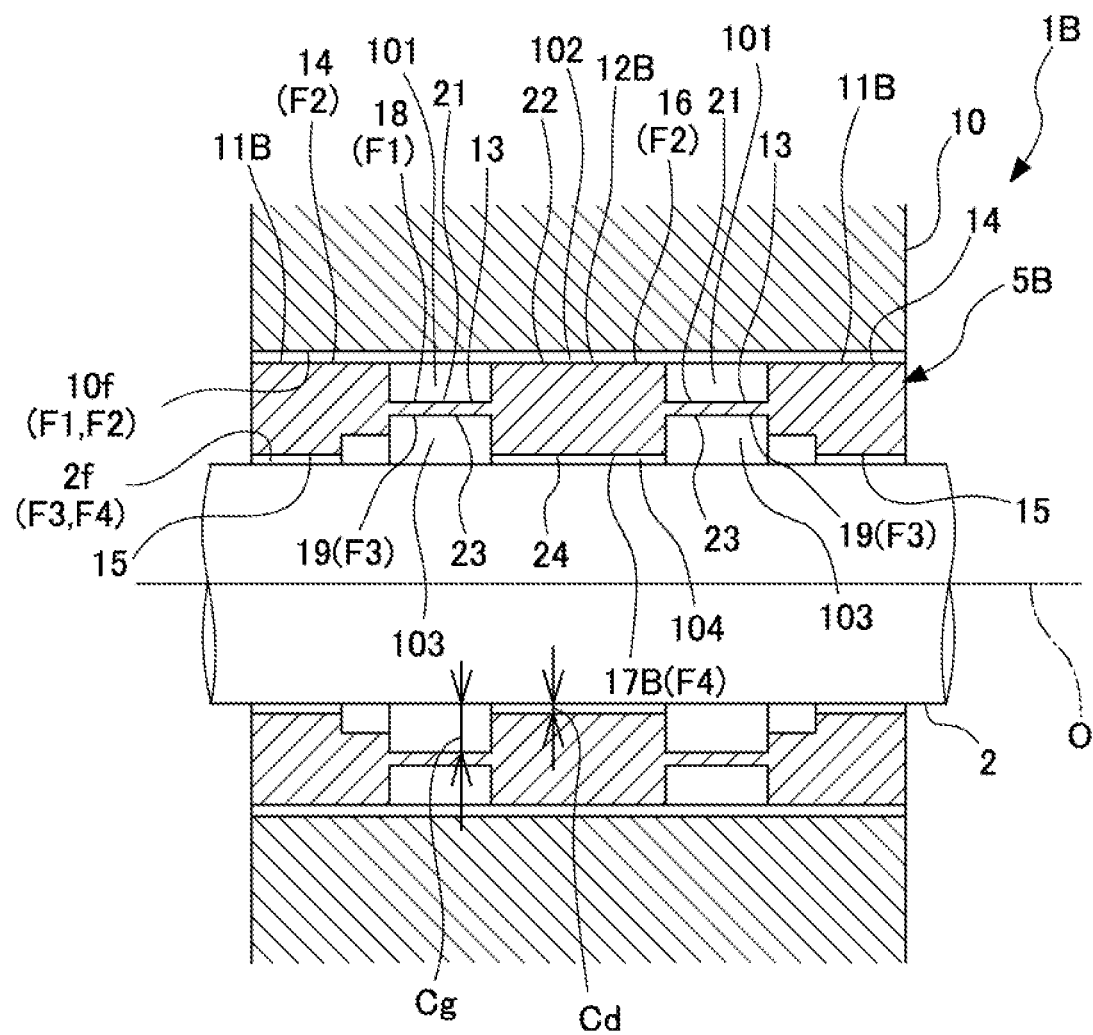
FIG. 3 is a sectional view illustrating a journal bearing according to a second embodiment of the present invention.

FIG. 3 is a sectional view illustrating a journal bearing of the rotary machine according to the second embodiment of the present invention.

As illustrated in FIG. 3, a journal bearing 5B of a turbocharger 1B according to this embodiment integrally includes bearing portions 11B, an intermediate facing portion 12B, and a connecting portion 13.

The bearing portions 11B are each disposed in both end portions in the direction of the central axis O in the journal bearing 5B. The respective bearing portions 11B include the outer peripheral load support surface 14 and the inner peripheral load support surface 15.

The intermediate facing portion 12B is located in the intermediate portion of the two bearing portions 118 in the direction of the central axis O. The intermediate facing portion 12B of the outer peripheral facing surface 16 faces the inner peripheral surface 10f of the bearing housing 10 with a gap in the radial direction.

The inner peripheral facing surface (second facing surface) 17B of the intermediate facing portion 12B faces the outer peripheral surface 2f of the rotary shaft 2 with a gap in the radial direction. The gap in the radial direction between an inner peripheral facing surface 17B of the intermediate facing portion 12B and the outer peripheral surface 2f of the rotary shaft 2 (hereinafter, referred to as a second gap 104) is set to the dimension Cd so that the oil film is held by the lubricant.

Here, if the diameter of the journal being 5B is set to D, for example, Cd/D=1/1000 to 20/1000 can be satisfied.

The connecting portion 13 connects each of the bearing portions 11B located on both sides in the direction of the central axis O and the intermediate facing portion 12B located in the intermediate portion in the direction of the central axis O to each other.

The journal bearing 5B configured in this way has a recess portion 23 that forms the inner peripheral surface 19 of the connecting portion 13 between the two inner peripheral load support surfaces 1 adjacent to each other at an interval in the direction of the central axis O. The recess portion 23 is formed to be recessed outward in the radial direction from the inner peripheral surface of the journal bearing 5B.

In addition, the journal bearing 5B has a projection portion 24 that forms the inner peripheral facing surface 17B of the intermediate facing portion 12B in the intermediate portion of the two recess portions 23 adjacent to each other in the direction of the central axis O. The projection portion 24 projects inward in the radial direction from the inner peripheral surface 19 that forms the recess portion 23.

The turbocharger 1B includes a first gap 103 and the second gap 104 between the journal bearing 5B and the outer peripheral surface 2f of the rotary shaft 2.

The first gap 103 is formed between the recess portion 23 (inner peripheral surface 19) and the outer peripheral surface 2f of the rotary shaft 2. The first gap 103 has the dimension Cg in the radial direction.

The second gap 104 is formed between the projection portion 24 (inner peripheral facing surface 17B) and the outer peripheral surface 2f of the rotary shaft 2. The second gap 104 has the dimension (second the dimension) Cd smaller than the dimension Cg in the radial direction. The inner peripheral surface 19 of the recess portion 23 and the outer peripheral surface 2f of the rotary shaft 2 configure a first gap forming portion F3 according to the present invention. The inner peripheral facing surface 17B of the projection portion 24 and the outer peripheral surface 21 of the rotary shaft 2 configure a second gap forming portion F4 according to the present invention.

As in the journal bearing 5A according to the above-described first embodiment, in the journal bearing 5B, the oil film is formed by the lubricant between the inner peripheral load support surface 15 of the bearing portions 11B located in both end portions in the direction of the central axis O and the outer peripheral surface 2f of the rotary shaft 2. In this manner, the oil film is reliably formed. Accordingly, frictional resistance is reduced between the inner peripheral load support surface 15 and the outer peripheral surface 2f of the rotary shaft 2, and the vibration damping effect in the radial direction of the rotary shaft 2 is achieved.

In addition, in the journal bearing 5B, the oil film is formed by the lubricant between the outer peripheral load support surface 14 of the bearing portion 11B located in both end portions in the direction of the central axis O and the inner peripheral surface 10f of the bearing housing 10. According to this oil film, the vibration damping effect in the radial direction is achieved between the journal bearing 5B and the bearing housing 10.

Furthermore, in the journal bearing 5B, the oil film is formed by the lubricant between the outer peripheral facing surface 16 of the intermediate facing portion 12B of the intermediate portion in the direction of the central axis O and the inner peripheral surface 10f of the bearing housing 10. According to this oil film, the vibration damping effect in the radial direction is achieved between the journal bearing 5B and the bearing housing 10.

In addition, in the journal bearing 5B, the oil film is formed by the lubricant between the inner peripheral facing surface 17B of the intermediate facing portion 12B of the intermediate portion in the direction of the central axis O and the outer peripheral surface 2f of the rotary shaft 2. According to this oil film the vibration damping effect in the radial direction is achieved between the journal bearing 58 and the rotary shaft 2.

Therefore, according to the turbocharger 1B and the journal bearing 5B of the above-described second embodiment, the bearing portions 11B (the outer peripheral load support surface 14 and the inner peripheral load support surface 15) are arranged in two locations at an interval in the direction of the central axis O. In this way, the bearing portions 11B arranged in two locations at an interval in the direction of the central axis O are integrated with each other, thereby suppressing an individual movement of the bearing portions 11B arranged in the two locations. In this manner, the vibrations in the conical mode of the rotary shaft 2 can be suppressed.

In addition, the first gap 103 and the second gap 104 are formed between the bearing portions 11B adjacent to each other in the direction of the central axis O on the inner peripheral surface of the journal bearing 5B, and the second gap 104 is smaller than the first gap 103. In this manner, in the second gap 104, the oil film of the lubricant can be held between the rotary shaft 2 and the inner peripheral facing surface 17B of the intermediate facing portion 12B of the journal bearing 5B. According to the oil film, it is possible to achieve the vibration damping effect of the rotary shaft 2. In this way, the second gap 104 for achieving the vibration damping effect is provided between the inner peripheral load support surfaces of the plurality of bearing portions 11B. Accordingly, the vibrations in the parallel mode of the rotary shaft 2 can be suppressed.

In addition, as in the above-described first embodiment, the first gap 101 and the second gap 102 are formed between the bearing portions 11B adjacent to each other in the direction of the central axis O on the outer peripheral surface of the journal bearing 5B, and the second gap 102 has the dimension Cd smaller than the dimension Cg of the first gap 101 in the radial direction. In this manner, in the second gap 102, the oil film of the lubricant can be held between the bearing housing 10 and the outer peripheral facing surface 16 of the intermediate facing portion 128 of the journal bearing 5B. According to the oil film, it is possible to achieve the vibration damping effect of the rotary shaft 2. In this way, the second gaps 102 and 104 for achieving the vibration damping effect are each provided between the outer peripheral load support surfaces 14 and between the inner peripheral load support surfaces 15 of the plurality of bearing portions 11B in the direction of the axis O. Accordingly, the vibrations in the parallel mode of the rotary shaft 2 can be further suppressed.

In addition, the journal bearing 5B integrally has the intermediate facing portion 12B that forms the second gaps 102 and 104 between the plurality of bearing portions 11B. The journal bearing 5B configured in this way can suppress the vibrations in the conical mode and the parallel mode of the rotary shaft 2.

Furthermore, the second gap 104 is located in the intermediate portion of the inner peripheral load support surfaces 15 adjacent to each other in the direction of the central axis O. According to this configuration, the vibration damping effect of the rotary shaft 2 can be effectively achieved by the oil film held in the second gap 104 in the intermediate portion of the inner peripheral load support surfaces 15 adjacent to each other.

First Modification Example of Second Embodiment

As in the first embodiment, according to the above-described second embodiment, the outer peripheral surface of the journal bearing 5B includes the first gap 101 formed by the recess portion 21 and the second gap 102 formed by the projection portion 22. However, the present invention is not limited thereto.

Figure 4:
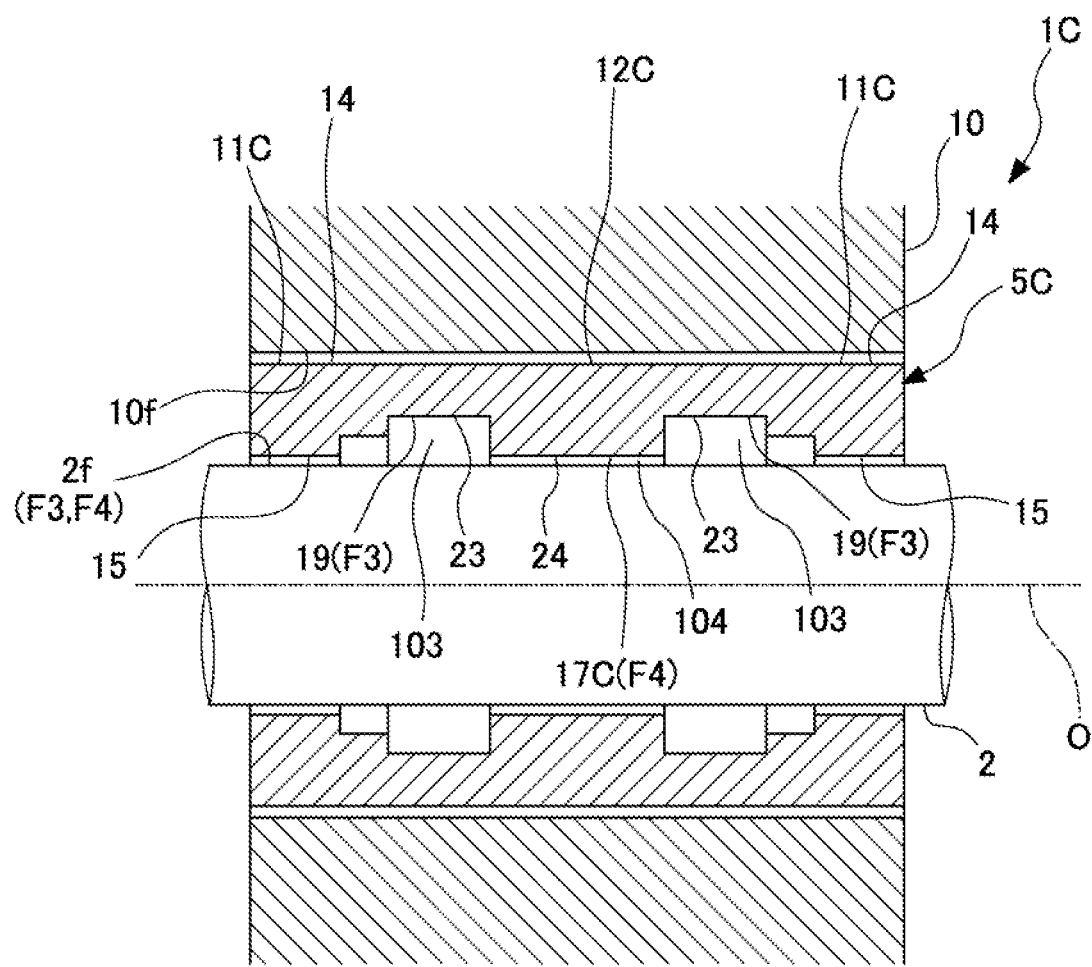
FIG. 4 is a schematic view illustrating a configuration of a journal bearing according to a first modification example of the second embodiment of the present invention.

FIG. 4 is a schematic view illustrating a configuration of a journal hearing according to a first modification example of the second embodiment.

As illustrated in FIG. 4, a journal bearing 5C according to the first modification example integrally includes bearing portions 11C, an intermediate facing portion 12C, and the connecting portion 13.

As in the above-described second embodiment, in a turbocharger 1C, the inner peripheral surface side of the journal bearing 5C includes the first gap 103 formed by the inner peripheral surface 19 of the recess portion 23, and the second gap 104 formed by 24 the inner peripheral facing surface 17C of the projection portion 24.

In the turbocharger 1C, the recess portion 21 or the projection portion 22 is not formed on the outer peripheral surface of the journal bearing 5C.

As in the second embodiment, the turbocharger 1C configured in this way has the first gap 103 and the second gap 104 between the recess portion 23 and the projection portion 24 which are formed on the inner peripheral surface of the journal bearing 5B and the outer peripheral surface 2f of the rotary shaft 2. In this manner, in the second gap 104, the oil film of the lubricant can be held between the outer peripheral surface 2f of the rotary shaft 2 and the inner peripheral facing surface (second facing surface) 17C of the intermediate facing portion 12C. According to the oil film, it is possible to achieve the vibration damping effect of the rotary shaft 2. In this way, the second gap 104 for achieving the vibration damping effect is provided between the inner peripheral load support surfaces 15 of the plurality of bearing portions 11C. Accordingly, the vibrations in the parallel mode of the rotary shaft 2 can be suppressed.

Second Modification Example of Second Embodiment

In the second embodiment, the inner peripheral surface of the journal bearing 5B includes the second gap 104 formed by the projection portion 24. However, the present invention is not limited thereto.

Figure 5:
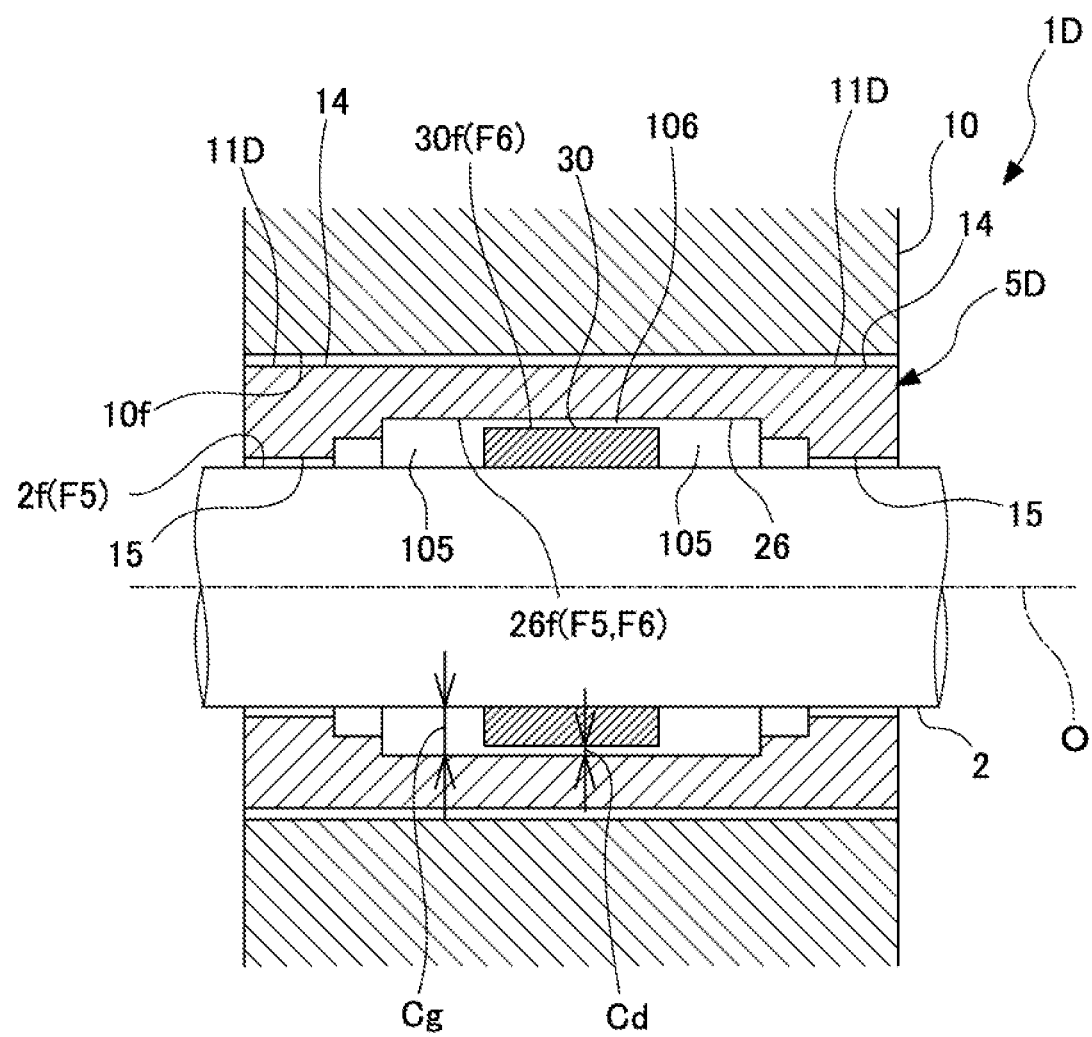
FIG. 5 is a schematic view illustrating a configuration of a second modification example of the journal bearing according to the second embodiment of the present invention.

FIG. 5 is a schematic view illustrating each configuration of a rotary machine and a journal bearing according to a second modification example of the second embodiment.

As illustrated in FIG. 5, a turbocharger 1D according to the second modification example includes a shaft side projection 30 between bearing portions 11D adjacent to each other in the direction of the central axis O in a journal bearing 5D. The shaft side projection 30 projects outward in the radial direction from the outer peripheral surface 2f of the rotary shaft 2.

The turbocharger 1D includes a second gap 106 between the shaft side projection 30 and the recess portion 26 formed on the inner peripheral surface of the journal beating 5D. The dimension Cd of the second gap 106 in the radial direction is smatter than the dimension Cg of the first gap 105 formed between the outer peripheral surface 2f of the rotary shaft 2 and the recess portion 26. An inner peripheral surface 26f of the recess portion 26 and the outer peripheral surface 2f of the rotary shaft 2 configure a first gap forming portion F5 according to the present invention. Furthermore, an outer peripheral surface 30f of the shaft side projection 30 and the inner peripheral surface 26f of the recess portion 26 configure a second gap forming portion F6 according to the present invention.

In the turbocharger 1D configured in this way, the second gap 106 is formed between the shaft side projection 30 and the recess portion 26.

In this way, in the turbocharger 1D, the vibration damping effect is achieved by the oil film formed in the second gap 106. Accordingly, the vibrations in the parallel mode of the rotary shaft 2 can be suppressed.

Third Modification Example of Second Embodiment

In addition, according to the second embodiment, the outer peripheral surface of the journal bearing 5B includes the second gap 102 formed by the projection portion 22. However, the present invention is not limited thereto.

Figure 6:
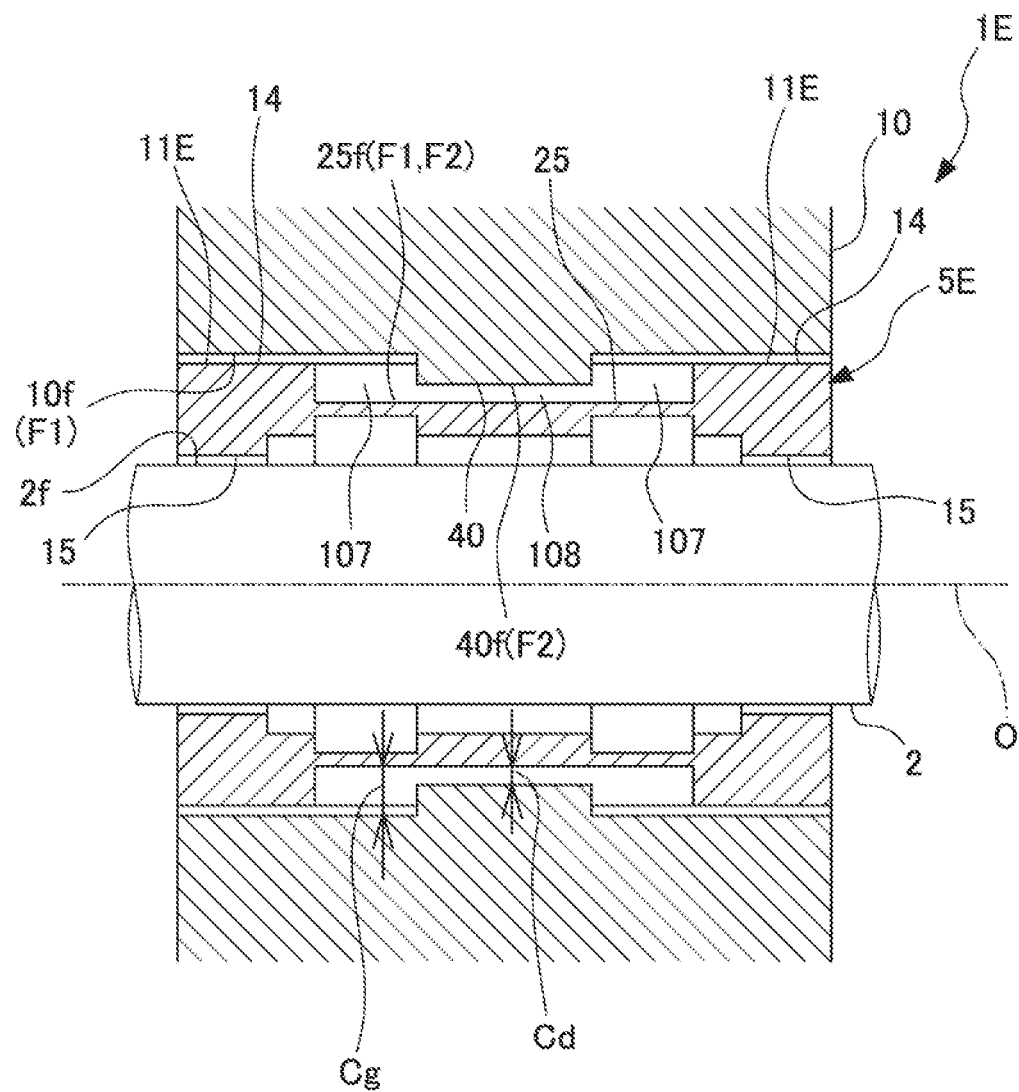
FIG. 6 is a schematic view illustrating a configuration of a third modification example of the journal bearing according to the second embodiment of the present invention.

FIG. 6 is a schematic view illustrating a configuration of a third modification example of the rotary machine and the journal bearing according to the second embodiment.

As illustrated in FIG. 6, a turbocharger 1E according to the third modification example includes a housing side projection 40 between two bearing portions 11E adjacent to each other in the direction of the central axis O in a journal bearing 5E. The housing side projection 40 projects inward in the radial direction from the inner peripheral surface 10f of the bearing housing 10.

The turbocharger 1E includes a second gap 108 between an inner peripheral surface 40f of the housing side projection 40 and an outer peripheral surface 25f of the recess portion 25. The dimension Cd of the second gap 108 in the radial direction is smaller than the dimension Cg of the first gap 107 formed between the inner peripheral surface 10f of the bearing housing 10 and the recess portion 25.

The turbocharger 1E configured in this way has the second gap 108 between the housing side projection 40 and the recess portion 25 formed on the outer peripheral surface of the journal bearing 5E. In this manner, the vibrations in the parallel mode of the rotary shaft 2 can be suppressed.

Third Embodiment

Next, a third embodiment of the turbocharger according to the present invention will be described. The third embodiment described below is different from the first and second embodiments only in a configuration including a lubricant supply unit. Therefore, the same reference numerals will be given to the same elements as those in the first and second embodiments, and repeated description thereof will be omitted.

Figure 7:
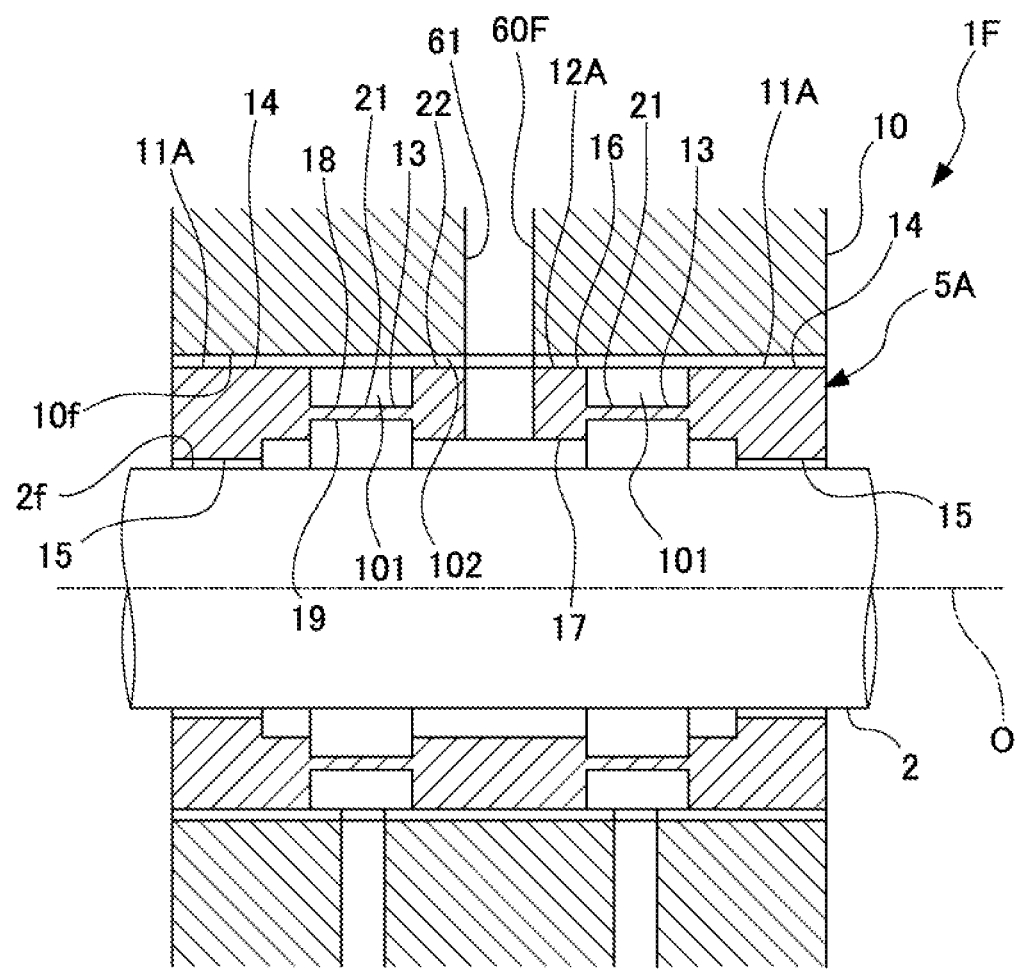
FIG. 7 is a sectional view of a journal bearing according to a third embodiment of the present invention.

FIG. 7 is a sectional view of the journal bearing of the rotary machine according to the third embodiment of the present invention.

As illustrated in FIG. 7, a turbocharger 1F according to the third embodiment includes the journal bearing 5A having the configuration as that according to the first embodiment.

The turbocharger 1F further includes a lubricant supply unit 60F. The lubricant supply unit 60F has the intermediate facing portion 12A of the journal bearing 5F and a lubricant flow path 61 for supplying the lubricant to between the rotary shaft 2 and the bearing housing 10. One or more lubricant flow paths 61 are disposed in a circumferential direction around the central axis O. The lubricant supply unit 60F feeds the lubricant to between the intermediate facing portion 12A, and the rotary shaft 2 and the bearing housing 10 by using a pump (not illustrated).

In the lubricant supply unit 60F configured in this way, the oil film is formed in the second gap 102 by the lubricant fed via the lubricant flow path 61.

According to this configuration, the vibration damping effect of the rotary shaft 2 can be further achieved by the oil film formed in the second gap 102 in the intermediate portion of the plurality of bearing portions 11A.

Therefore, according to the turbocharger 1F of the above-described third embodiment, as in the first embodiment, the oil film can be formed in the second gap 102 between the bearing housing 10 and the outer peripheral facing surface 16 of the intermediate facing portion 12A of the journal bearing 5A by the lubricant fed from the lubricant supply unit 60F. The vibration damping effect of the rotary shaft 2 can be improved by the oil film. In this way, the second gap 102 for achieving the vibration damping effect achieved by the oil film of the lubricant is provided. Accordingly, the vibrations in the parallel mode of the rotary shaft 2 can be further suppressed by hydraulic pressure of the supplied lubricant.

In addition, as in the first embodiment, the bearing portions 11A arranged in two locations at an interval in the direction of the central axis O are integrated with each other in the journal bearing 5C, thereby suppressing an individual movement of the bearing portions 11A arranged in the two locations. In this manner, the vibrations in the conical mode of the rotary shaft 2 can be suppressed.

Fourth Embodiment

Next, a fourth embodiment of the turbocharger according to the present invention will be described. The fourth embodiment described below is different from the first to third embodiments only in a configuration including a lubricant supply unit. Therefore, the same reference numerals will be given to the same elements as those in the first to third embodiments, and repeated description thereof will be omitted.

Figure 8:
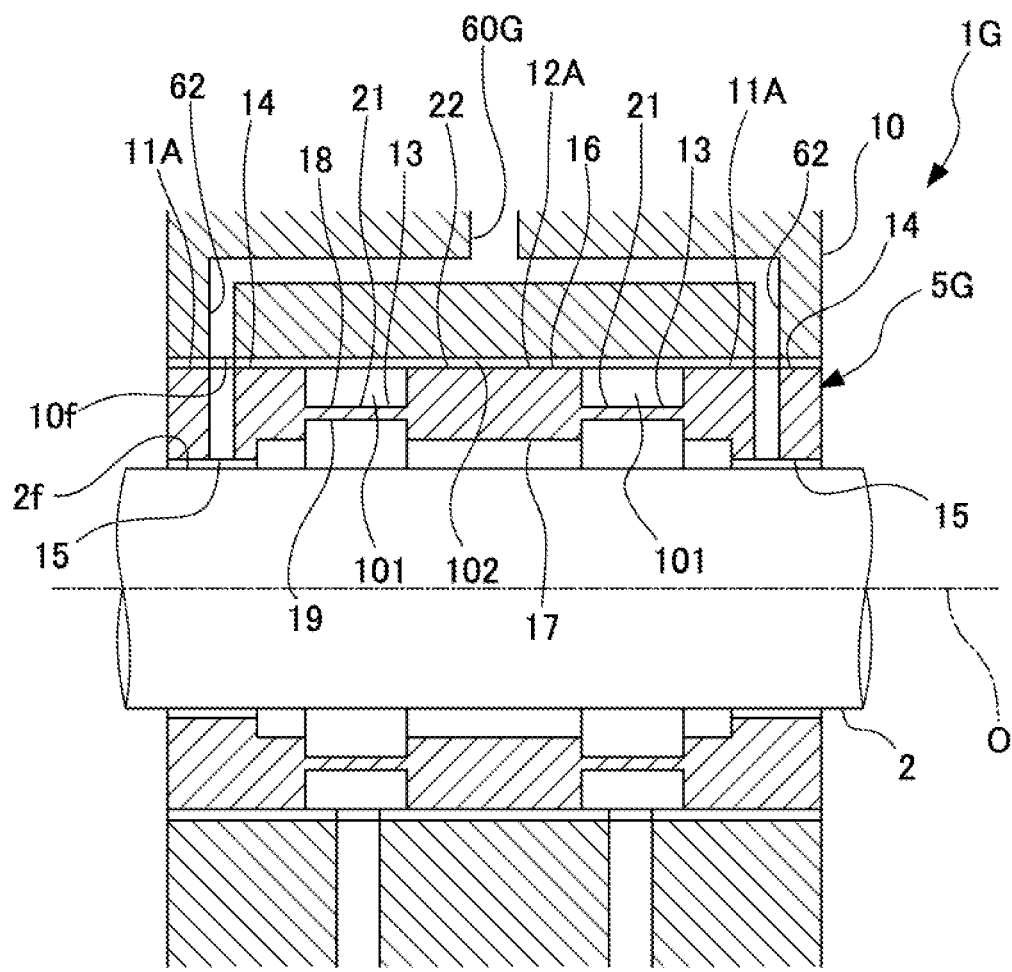
FIG. 8 is a sectional view of a journal bearing according to a fourth embodiment of the present invention.

FIG. 8 is a sectional view of a journal bearing of a rotary machine according to the fourth embodiment of the present invention.

As illustrated in FIG. 8, a turbocharger 1G according to the fourth embodiment includes a journal bearing 5G having the same configuration as that according to the first embodiment.

The turbocharger 1G further includes a lubricant supply unit 60G. The lubricant supply unit 60G has a lubricant flow path 62 for supplying the lubricant to between each of the bearing portions 11A of the journal bearing 5G, and the rotary shaft 2 and the bearing housing 10. The lubricant supply unit 60G feeds the lubricant to between the outer peripheral load support surface 14 of the bearing portion 11A and the bearing housing 10, and to between the inner peripheral load support surface 15 and the rotary shaft 2 by using a pump (not illustrated).

In the lubricant supply unit 60G configured in this way, the lubricant fed via the lubricant flow path 62 forms each oil film of the lubricant between the outer peripheral load support surface 14 of the respective bearing portions 11A and the bearing housing 10, and between the inner peripheral load support surface 15 and the rotary shaft 2.

Therefore, according to the turbocharger 1G of the above-described fourth embodiment, the lubricant is fed to between the outer peripheral load support surface 14, the inner peripheral load support surface 15, the rotary shaft 2, and the bearing housing 10. The vibration damping effect of the rotary shaft 2 can be more effectively achieved by hydraulic pressure of the supplied lubricant in the plurality of locations arranged at an interval in the direction of the central axis O.

In addition, as in the above-described first embodiment, the bearing portions 11A arranged in two locations at an interval in the direction of the central axis O are integrated with each other in the journal bearing 5G, thereby suppressing an individual movement of the bearing portions 11A arranged in the two locations. In this manner, the vibrations in the conical mode of the rotary shaft 2 can be suppressed.

In addition, in the second gap 102, the vibration damping effect of the rotary shaft 2 can be achieved by the oil film formed between the rotary shaft 2, the bearing housing 10, and the journal bearing 5G. The second gap 102 for achieving the vibration damping effect is provided between the plurality of outer peripheral load support surfaces 14 and inner peripheral load support surfaces 15. In this manner, the vibrations in the parallel mode of the rotary shaft 2 can be suppressed.

Fifth Embodiment

Next, a fifth embodiment of a turbocharger and a journal bearing according to the present invention will be described. The fifth embodiment described below is different from the first embodiment only in a configuration of a thrust bearing. Therefore, the same reference numerals will be given to the same elements as those in the first embodiment, and repeated description thereof will be omitted.

Figure 9:
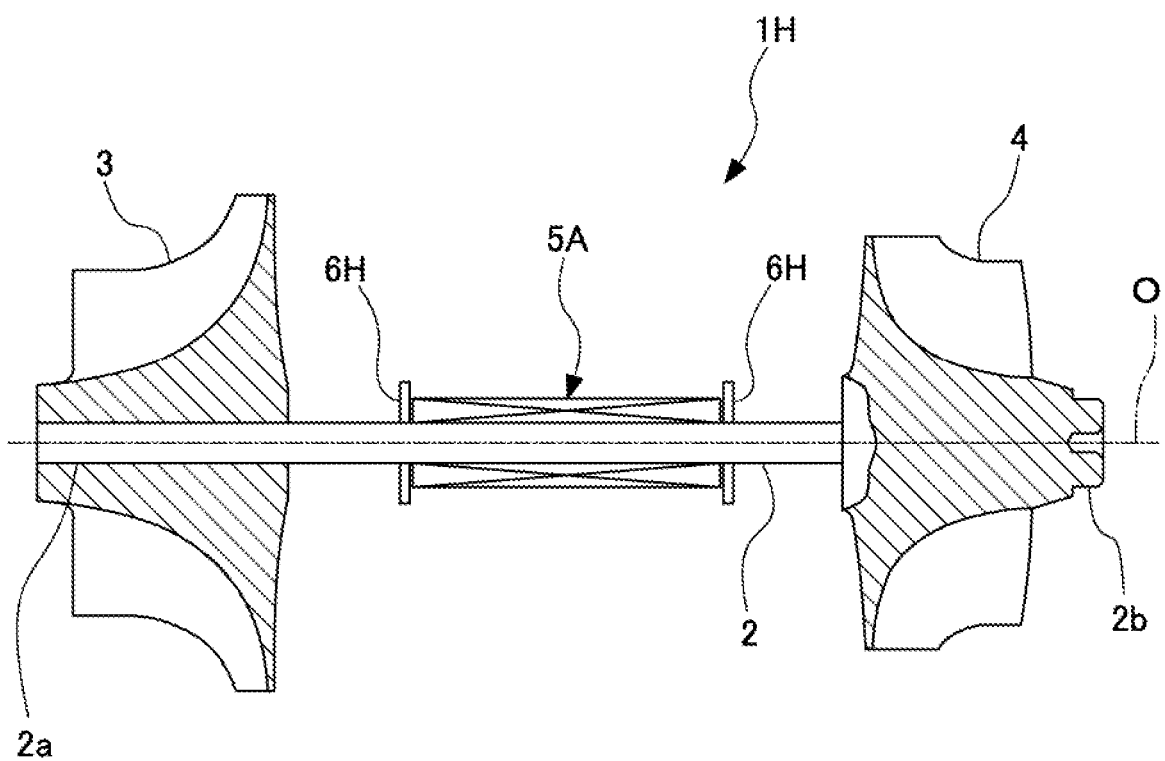
FIG. 9 is a schematic view illustrating, a configuration of a turbocharger according to a fifth embodiment of the present invention.
Figure 10:
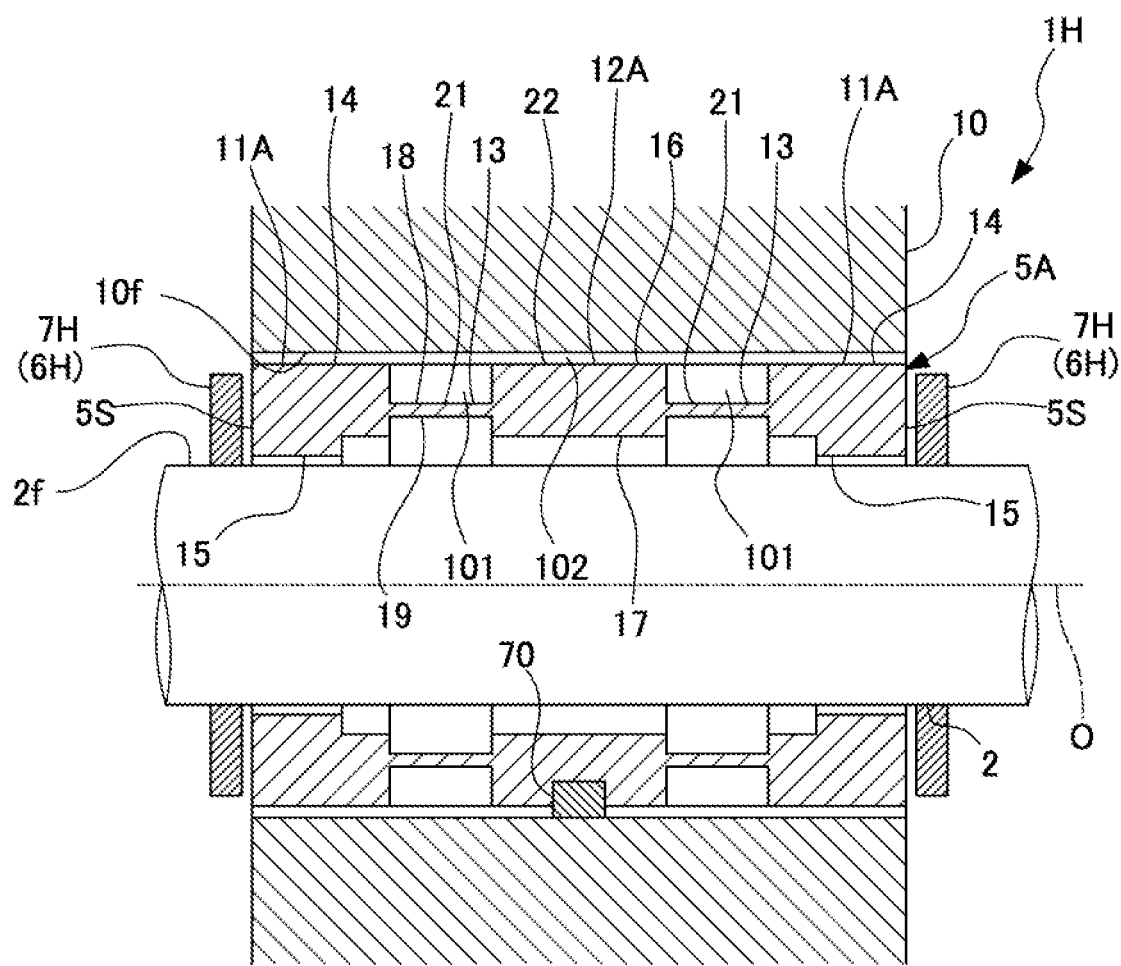
FIG. 10 is a sectional view of a journal bearing according to the fifth embodiment of the present invention.

FIG. 9 is a schematic view illustrating a configuration of the turbocharger according to the fifth embodiment of the present invention. FIG. 10 is a sectional view of the journal bearing according to the fifth embodiment.

As illustrated in FIG. 9, a turbocharger 1H according to the fifth embodiment includes the rotary shaft 2, the turbine wheel 3, the compressor wheel 4, the journal bearing 5A, and a thrust bearing 6H.

The thrust bearing 6H is disposed inside the turbocharger 1H housing (not illustrated). The thrust bearing 6H supports a load applied in the direction of the central axis O of the rotary shaft 2. As illustrated in FIG. 10, the thrust beating 6H includes thrust discs H disposed in the rotary shaft 2. The thrust disc 7H is formed to extend outward in the radial direction from the outer peripheral surface 2f of the rotary shaft 2. The thrust discs 7H are each disposed on both sides of the journal bearing 5A in the direction of the central axis O. The thrust discs 7H each face end surfaces 5s on both sides of the journal bearing 5A in the direction of the central axis O.

The journal bearing 5A is restrained in the direction of the central axis O. Accordingly, the journal bearing 5A is fixed to the bearing housing 10 by a fixing member 70.

The thrust bearing 6H configured in this way regulates the movement of the rotary shaft 2 in the direction of the central axis O (thrusting direction) in such a way that the thrust disc 7H disposed in the rotary shaft 2 butts against the end surface 5s of the journal bearing 5A.

In the turbocharger 1G according to the above-described fourth embodiment, the thrust discs 7H are each configured to face the end surfaces 5s of the journal bearing 5A in the direction of the central axis O. In this manner, the thrust bearing 6H is configured to include the thrust disc H and the journal bearing 5A. Therefore, it is possible to minimize the number of components for configuring the thrust bearing 6H.

In addition, the rotary shaft 2 may have a reduced space for providing the thrust bearing 6H. Accordingly, the length of the rotary shaft 2 in the direction of the central axis O can be shortened. The natural frequency of the rotary shaft 2 can be increased by shortening the length of the rotary shaft 2. Unless the rotational speed is high, the rotary shaft 2 is less likely to generate self-excited vibrations. In this manner, the vibrations of the rotary shaft 2 can also be suppressed.

OTHER MODIFICATION EXAMPLES

The present invention is not limited to the above-described embodiments, and includes those in which various modifications are added to the above-described embodiments within the scope not departing from the gist of the present invention. That is, the specific shapes or configurations described as examples in the embodiments are merely examples, and can be appropriately changed.

Figure 11:
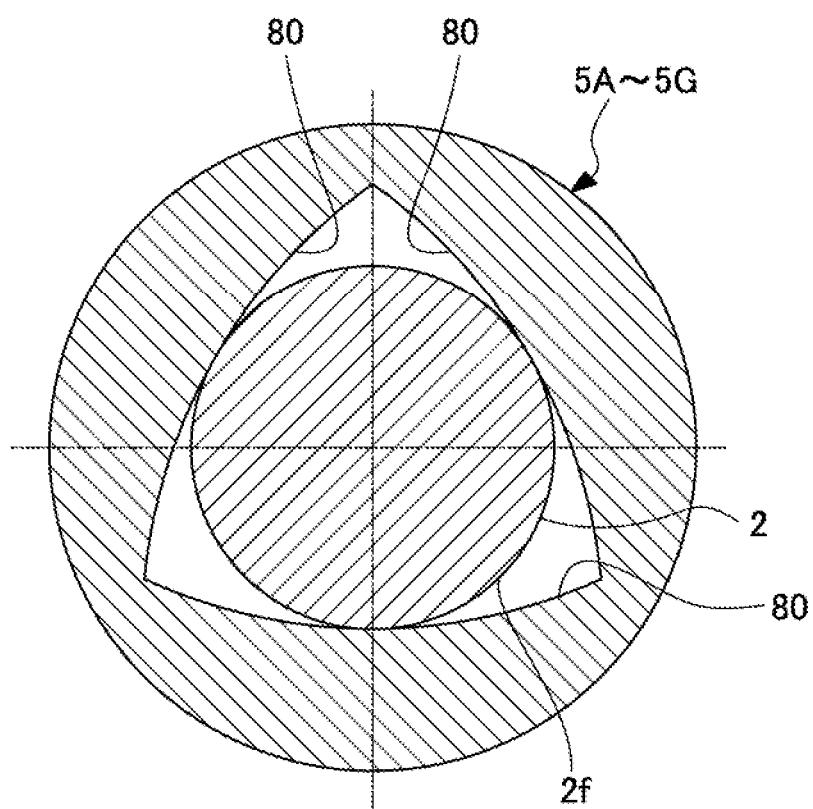
FIG. 11 is a sectional view of a journal bearing according to another modification example of the embodiment of the present invention.

FIG. 11 is a sectional view of a journal bearing according to another modification example of the embodiment of the present invention.

For example, as illustrated in FIG. 11, in the journal bearings 5A to 5G, the inner peripheral surface 5h may have a so-called multi-arc shape including a plurality of arc-shaped surfaces 80 in the circumferential direction. Each of the arc-shaped surfaces 80 is formed with a radius of curvature which is larger than a radius of curvature of the outer peripheral surface 2f of the rotary shaft 2.

Furthermore, a projection (for example, the housing side protection 40) may be provided to face the projection portions 22 and 24 on the inner peripheral surface 101 of the bearing housing 10 according to the above-described respective embodiments. Similarly, a projection that faces the shaft side projection 30 may be provided.

In addition, according to the above-described embodiments, the journal hearings 5A to 5G include the bearing portions 11A to 11F, the intermediate facing portions 12A, 12B, 12C, and 12F, and the connecting portion 13. However, the present invention is not limited thereto. For example, the journal bearing 5A to 5G may be integrated by combining a plurality of components with each other.

In addition, according to the above-described embodiments, the turbochargers 1A to 1H are used for the ships. However, the present invention is not limited thereto. The turbochargers 1A to 1H may be used for vehicles such as automobiles or for other purposes.

Furthermore, in the above-described embodiments, the turbochargers 1A to 1H have been described as an example of the rotary machine. However, for example, the rotary machine may be a compressor.

INDUSTRIAL APPLICABILITY

The present invention is applicable to the rotary machine and the journal bearing. According to the present invention, the vibrations of the rotary shaft can be suppressed.

REFERENCE SIGNS LIST 1A to 1H: turbocharger
2: rotary shaft
2a: first end portion
2b: second end portion
2f: outer peripheral surface
3: turbine wheel
4: compressor wheel
5A to 5G: journal bearing
5h: inner peripheral surface
5s: end surface
6A, 6H: thrust bearing
7, 7H: thrust disc
8: stationary disc
10: bearing housing
10f: inner peripheral surface
11A to 11F: bearing portion
12A, 12B, 12C, 12F: intermediate facing portion
13: connecting portion
14: outer peripheral load support surface (load support surface)
15: inner peripheral load support surface (load support surface)
16: outer peripheral facing surface (second facing surface)
17B, 17C: inner peripheral facing surface (second facing surface)
18: outer peripheral surface (first facing surface)
19: inner peripheral surface (first facing surface)
21, 23, 25, 26: recess portion.
22, 24: projection portion
30: shaft side projection
40: housing side projection
60F, 60G: lubricant supply unit
61, 62: lubricant flow path
70: fixing member
80: arc-shaped surface
101, 103, 105, 107: first gap
102, 104, 106, 108: second gap
F1, F3, F5: first gap forming portion
F2, F4, F6: second gap forming portion
O: central axis

The invention claimed is:

1. A rotary machine comprising:
a rotary shaft that extends along a central axis;
a journal bearing that supports the rotary shaft to be rotatable around the central axis, and that having an inner peripheral surface and an outer peripheral surface each have a circular shape in a cross section perpendicular to the central axis; and
a bearing housing that supports the journal bearing,
wherein the journal bearing includes
a first bearing portion and a second bearing portion that are arranged at an interval in the direction of the central axis,
an intermediate facing portion that is arranged between the first bearing portion and the second bearing portion in the direction of the central axis,
a first connecting portion that extends in the direction of the central axis to connect the first bearing portion and the intermediate facing portion, and
a second connecting portion that extends in the direction of the central axis to connect the second bearing portion and the intermediate facing portion,
wherein the first bearing portion and the second bearing portion have an inner peripheral load support surface that faces the rotary shaft and that supports a load applied in a direction perpendicular to the central axis, and an outer peripheral load support surface that faces the bearing housing and that supports a load applied in a direction perpendicular to the central axis, respectively, wherein the intermediate facing portion has an inner facing surface that faces the rotary shaft, and an outer facing surface that faces the bearing housing, wherein the first connecting portion and the second connecting portion have an inner surface that faces the rotary shaft, and an outer surface that faces the bearing housing, respectively, wherein an inner first gap is formed between the inner surface of the first connecting portion and the rotary shaft in a radial direction around the central axis, and between the inner surface of the second connecting portion and the rotary shaft in the radial direction, wherein an outer first gap is formed between the outer surface of the first connecting portion and the bearing housing in the radial direction, and between the outer surface of the second connecting portion and the bearing housing in the radial direction, wherein an inner second gap is formed between the inner facing surface of the intermediate facing portion and the rotary shaft in the radial direction, wherein an outer second gap is formed between the outer facing surface of the intermediate facing portion and the bearing housing in the radial direction, wherein the inner second gap is smaller than the inner first gap and larger than a gap between the inner peripheral load support surface and the rotary shaft in the radial direction, and wherein the outer second gap is smaller than the outer first gap and larger than a gap between the outer peripheral load support surface and the bearing housing in the radial direction.

* * * * *